US009434844B2

(12) United States Patent
Walls et al.

(10) Patent No.: US 9,434,844 B2
(45) Date of Patent: Sep. 6, 2016

(54) ADDITIVE, COMPOSITION COMPRISING IT AND USE THEREOF

(71) Applicant: Ineos Europe AG, Vaud (CH)

(72) Inventors: Christopher Walls, Cheshire (GB); Andrew John Bunney, Cheshire (GB); Maurice Sydney Newton, Cheshire (GB)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/351,236

(22) PCT Filed: Oct. 12, 2012

(86) PCT No.: PCT/EP2012/070269
§ 371 (c)(1),
(2) Date: Apr. 11, 2014

(87) PCT Pub. No.: WO2013/053895
PCT Pub. Date: Apr. 18, 2013

(65) Prior Publication Data
US 2014/0275391 A1    Sep. 18, 2014

(30) Foreign Application Priority Data
Oct. 12, 2011 (EP) ................................. 11184892

(51) Int. Cl.
C09D 5/16 (2006.01)
B05D 7/22 (2006.01)
C08F 2/00 (2006.01)
B05D 3/10 (2006.01)

(52) U.S. Cl.
CPC ............... C09D 5/16 (2013.01); B05D 3/108 (2013.01); C08F 2/004 (2013.01); C08F 2/005 (2013.01); C09D 5/1668 (2013.01)

(58) Field of Classification Search
None
See application file for complete search history.

(56) References Cited

U.S. PATENT DOCUMENTS

| | | |
|---|---|---|
| 3,332,789 A | 7/1967 | Abbott, Jr. |
| 3,962,167 A * | 6/1976 | Martorano et al. ........... 524/512 |
| 4,431,783 A | 2/1984 | Walker et al. |
| 4,808,655 A * | 2/1989 | Gulbins et al. ............... 524/504 |
| 4,814,406 A | 3/1989 | Katayama et al. |
| 5,240,469 A | 8/1993 | Poindexter |
| 5,324,393 A | 6/1994 | Poindexter |
| 5,391,653 A | 2/1995 | Shimizu et al. |
| 5,416,174 A | 5/1995 | Shimizu et al. |
| 5,420,214 A | 5/1995 | Shimizu et al. |
| 5,424,377 A | 6/1995 | Shimizu et al. |
| 5,436,284 A | 7/1995 | Honda et al. |
| 5,442,002 A | 8/1995 | Shimizu et al. |
| 5,453,472 A | 9/1995 | Deckers et al. |
| 5,484,856 A | 1/1996 | Shimizu et al. |
| 5,492,982 A | 2/1996 | Shimizu et al. |
| 5,508,361 A | 4/1996 | Shimizu et al. |
| 5,525,721 A | 6/1996 | Ohshima et al. |
| 5,576,370 A | 11/1996 | Shimizu et al. |
| 5,597,878 A | 1/1997 | Nakano et al. |
| 5,612,426 A | 3/1997 | Nakano et al. |
| 5,616,660 A | 4/1997 | Shimizu et al. |
| 5,646,198 A | 7/1997 | Tanaka et al. |
| 5,691,428 A | 11/1997 | Shimizu et al. |
| 5,728,781 A | 3/1998 | Usuki et al. |
| 5,780,104 A | 7/1998 | Takahashi et al. |
| 5,789,499 A | 8/1998 | Masuko et al. |
| 5,858,176 A | 1/1999 | Arhancet |
| 5,883,209 A | 3/1999 | Nakano et al. |
| 5,888,589 A | 3/1999 | Carlin et al. |
| 5,889,101 A | 3/1999 | Schlarb et al. |
| 5,889,103 A | 3/1999 | Shimizu et al. |
| 5,908,965 A | 6/1999 | Kwon et al. |
| 5,951,748 A | 9/1999 | Arhancet |
| 6,001,937 A | 12/1999 | Krishnamurti et al. |
| 6,022,932 A | 2/2000 | Ooura et al. |
| 6,069,199 A | 5/2000 | Carlin et al. |
| 6,114,476 A | 9/2000 | Krishnamurti et al. |
| 6,121,390 A | 9/2000 | Shimizu et al. |
| 6,133,345 A | 10/2000 | Pakusch et al. |
| 6,174,986 B1 | 1/2001 | Nakamura et al. |
| 6,232,412 B1 | 5/2001 | Raspanti et al. |
| 6,271,320 B1 | 8/2001 | Keller et al. |
| 6,288,177 B1 | 9/2001 | Ooura et al. |
| 6,300,427 B1 | 10/2001 | Krishnamurti et al. |
| 6,310,156 B1 | 10/2001 | Maeda et al. |
| 6,320,001 B1 | 11/2001 | Shimizu et al. |
| 6,326,454 B1 | 12/2001 | Shimizu et al. |
| 6,355,743 B1 | 3/2002 | Ooura et al. |
| 6,444,729 B1 | 9/2002 | Pakusch et al. |
| 6,461,440 B1 | 10/2002 | Sutoris et al. |

(Continued)

FOREIGN PATENT DOCUMENTS

| | | |
|---|---|---|
| CA | 1 181 899 | 1/1985 |
| CN | 1616508 A | 9/2004 |
| DE | 198 56 590 A1 | 6/2000 |
| EP | 0 052 421 A1 | 5/1982 |
| EP | 0 172 427 A2 | 2/1986 |
| EP | 0 632 121 A2 | 1/1995 |
| EP | 0 682 043 A2 | 11/1995 |
| EP | 0 695 761 A2 | 2/1996 |
| EP | 0 698 580 A1 | 2/1996 |
| EP | 0 890 593 B1 | 1/2003 |
| GB | 1 439 339 | 6/1976 |
| GB | 2 338 712 A | 12/1999 |

(Continued)

OTHER PUBLICATIONS

Machine translation of CA-1181899 A1.*

(Continued)

Primary Examiner — Vu A Nguyen
(74) Attorney, Agent, or Firm — Nixon & Vanderhye P.C.

(57) ABSTRACT

Composition containing at least one poly acrylate (co) polymer binder and at least one of a condensation product formed by reaction of an effective 1-naphthol and formaldehyde, and a naphthalene molecule substituted in at least one of positions 1 to 8 with a sulfur-containing radical.

9 Claims, No Drawings

(56) References Cited

U.S. PATENT DOCUMENTS

| | | |
|---|---|---|
| 6,469,201 B1 | 10/2002 | Martin et al. |
| 6,506,854 B2 | 1/2003 | Krishnamurti et al. |
| 6,512,045 B2 | 1/2003 | Raspanti |
| 6,770,219 B2 | 8/2004 | Tong |
| 6,797,329 B2 | 9/2004 | Elder |
| 6,822,045 B2 | 11/2004 | Miyatake et al. |
| 6,906,129 B2 | 6/2005 | Watanabe et al. |
| 7,338,633 B2 | 3/2008 | Carlin |
| 2004/0068034 A1 | 4/2004 | Takaki et al. |
| 2006/0293467 A1 | 12/2006 | Yoneda et al. |

FOREIGN PATENT DOCUMENTS

| | | |
|---|---|---|
| JP | 54-107991 A | 8/1979 |
| JP | 04351604 A | 12/1992 |
| JP | 05155940 A | 6/1993 |
| JP | 05320210 A | 12/1993 |
| JP | 06032807 A | 2/1994 |
| JP | 06107708 A | 4/1994 |
| JP | 06192303 A | 7/1994 |
| JP | 06192304 A | 7/1994 |
| JP | 07002907 A | 1/1995 |
| JP | 07018004 A | 1/1995 |
| JP | 07133302 A | 5/1995 |
| JP | 07278205 A | 10/1995 |
| JP | 07286001 A | 10/1995 |
| JP | 08034803 A | 2/1996 |
| JP | 08081507 A | 3/1996 |
| JP | 08081508 A | 3/1996 |
| JP | 08109202 A | 4/1996 |
| JP | 08109203 A | 4/1996 |
| JP | 08183808 A | 7/1996 |
| JP | 08231608 A | 9/1996 |
| JP | 08245704 A | 9/1996 |
| JP | 08311108 A | 11/1996 |
| JP | 08311109 A | 11/1996 |
| JP | 08311110 A | 11/1996 |
| JP | 09077805 A | 3/1997 |
| JP | 09087304 A | 3/1997 |
| JP | 09087308 A | 3/1997 |
| JP | 09176209 A | 7/1997 |
| JP | 09241305 A | 9/1997 |
| JP | 10060008 A | 3/1998 |
| JP | 2832867 B2 | 12/1998 |
| JP | 2000-63403 A | 2/2000 |
| JP | 2000-143708 A | 5/2000 |
| JP | 2001-40006 A | 2/2001 |
| JP | 2001-40007 A | 2/2001 |
| JP | 2001-354707 A | 12/2001 |
| JP | 2003-40908 A | 2/2003 |
| JP | 2003-40909 A | 2/2003 |
| JP | 2003-48904 A | 2/2003 |
| JP | 2003-192754 A | 7/2003 |
| JP | 2004-238459 A | 8/2004 |
| JP | 2005-48024 A | 2/2005 |
| JP | 2005-82641 A | 3/2005 |
| JP | 2005-170982 A | 6/2005 |
| JP | 2005-187506 A | 7/2005 |
| JP | 2006-282825 A | 10/2006 |
| JP | 2009-102627 A | 5/2009 |
| KR | 2009-070972 A | 7/2009 |
| KR | 2009-073389 A | 7/2009 |
| WO | WO 96/18656 A1 | 6/1996 |
| WO | WO 97/08210 A1 | 3/1997 |
| WO | WO 99/43715 A1 | 9/1999 |
| WO | WO 9943715 A1 | 9/1999 |
| WO | WO 01/44209 A1 | 6/2001 |
| WO | WO 03/068826 A1 | 8/2003 |
| WO | WO 2005/087815 A1 | 9/2005 |
| WO | WO 2010/151320 A1 | 12/2010 |

OTHER PUBLICATIONS

Text of Second Office Action issued by the Chinese Patent Office in corresponding Chinese Patent Application No. 201280060537.6, filed Oct. 12, 2012; 7 pages (English Translation).

Search Report, issued in corresponding Chinese Patent Application No. 201280060537.6, filed Oct. 12, 2012; 2 pages (English Translation).

Julü Yixi, et al; "Polyvinyl chloride process engineering"; CPCH1460883P, 7 pgs.; May 15, 2016.

* cited by examiner

ADDITIVE, COMPOSITION COMPRISING IT AND USE THEREOF

This application is the U.S. national phase of International Application No. PCT/EP2012/070269 filed 12 Oct. 2012 which designated the U.S. and claims priority to 11184892.5 filed 12 Oct. 2011, the entire contents of each of which are hereby incorporated by reference.

This invention relates to an additive, compositions comprising the additive and uses thereof. More especially the invention relates to antifouling additives for use in processes for polymerisation aqueous suspensions. The invention has particular application for example in the polymerisation of vinyl chloride optionally in the presence of other monomers.

It is well known to polymerise aqueous suspensions of monomers such as vinyl chloride (hereinafter sometimes referred to as VCM) to produce polymers. A problem with this is that some of the produced polymeric material coats the reactor vessel and internals. This gives rise to several disadvantages including reduction in heat transfer across the reactor walls and wastage of monomer. Furthermore while the polymer is generally firmly bonded to the reactor walls particles may be dislodged affecting the resulting polymer quality.

It is known to provide antifouling compositions. These materials are applied to the reactor walls and resist formation of a polymer coat on the reactor walls. Examples of these materials include partially hydrolysed polyvinyl acetates (hereinafter sometimes referred to as PVA). A problem with these materials is that generally a recoating is required after each polymerisation batch.

Attempts have been made to provide antifouling compositions which do not need recoating after every polymerisation batch. Examples of such materials are described for example in GB 1 439 339, EP 0 052 421, JP 54 107 991 and WO 9708210.

GB 1 439 339 describes an antifouling composition which is obtained by reaction of phenol with formaldehyde. According to JP 54 107 991 this material is not very effective because excessive crosslinking has occurred.

EP 0 052 421 describes antifouling compositions obtained by the reaction of formaldehyde with "an effective 1-naphthol". As used in EP 0 052 421 effective naphthol is a naphthol which is capable of copolymerising with formaldehyde at the 2 and 4 positions. As such the 2 and 4 positions are unsubstituted and the 3 position is either unsubstituted or not substituted with a strongly electron withdrawing group such as sulfonic acid.

JP 54 107 991 describes antifouling compositions from early stage phenol/formaldehyde condensation products. According to EP 0 052 421 while better than the antifouling material described in GB 1 439 339 this material produces variable results.

WO 97 08 210 describes antifouling compositions based on naphthenic molecules substituted with sulfur compounds at at least one position on the aromatic structure.

A problem with these materials especially when used in combination with PVA is that they are not strongly adherent to the reactor walls. This gives rise to several problems. First excessive material must be applied which is then wasted. Secondly productivity is reduced since material which drains from the reactor walls should be collected and removed. Thirdly material which does not remain on the reactor wall mixes with reactant mixture and can change the properties of the resulting polymer.

The invention therefore seeks to provide improved antifouling compositions for use in polymerisation of polymerisable monomers such as VCM and in particular to make antifoul compositions more adherent to reactor walls. It has surprisingly been found that acrylate polymers such as polyacrylate ester (co)polymers improve the retention properties of antifouling compositions especially those comprising condensation products of a phenol or 1-naphthol and formaldehyde or a 1-naphthol having a sulfur-containing substituent. It has even more surprisingly been found that contrary to the teaching of many prior disclosures PVA can make antifouling compositions less adherent to reactor walls.

In addition to the binder a further component is present which may be selected from i) a cross-linked product formed by reacting formaldehyde and a phenol for example as described in GB1439339 ii) a phenol/formaldehyde condensate for example as described in CA1181899 iii) 1-naphthol formaldehyde condensation products for example as described in EP0052421 and iv) naphthenic molecules substituted with sulfur for example as described in WO9708210 other antifouling compositions can also be used either alone or in admixture with components i) to (iv).

Each of those named classes of antifouling material are described in more detail:

1 Cross-Linked Phenol Formaldehyde Condensation Product

The condensation product is an insoluble cross-linked polymeric material containing polar groups formed from a reaction mixture having an aldehyde, preferably formaldehyde, as one component thereof. The other component or at least one of the other components (if more than one) of the reaction mixture should have more than two sites of reactivity in order to form a cross-linked polymer with the aldehyde.

By "insoluble" it is meant that the polymeric material does not dissolve in or react with the aqueous medium (whether it be acidic, neutral or alkaline) or with the organic medium used in the polymerisation.

Suitable cross-linked polymeric materials include the materials obtained by condensing monomeric phenols such as phenol and parahydroxybenzoic acid with an aldehyde and the materials obtained by cross-linking polar monomeric or polymeric materials such as melamine, diaminodiphenyl ether, urea and polyethylene imine with an aldehyde. It is preferred that the aldehyde employed is formaldehyde since cross-linked products are easily obtainable with this material. It is to be under stood that many of the polar groupings in such cross-linked materials may not have taken part in the cross-linking reaction.

In the case of the basic (i.e. alkaline) coating material it is preferred that the polymerising medium is kept at a pH of greater than 4 by the use (where necessary) of buffers or alkaline substances. Suitable alkaline substances include sodium, potassium, calcium and ammonium hydroxides, carbonates and bicarbonates, and buffers include mixtures of the disodium and monosodium hydrogen ortho phosphates ($Na_2HPO_4$ and $NaH_2PO_4$).

It is of course to be understood that the pH of the reaction medium may of its own accord remain above 4 in which case the addition of a buffer or alkaline substance may not be necessary.

A preferred coating material is obtained by reacting 1.2 parts polyethylene imine with 5 parts formaldehyde and heating at 80° C. for 10 minutes. Another preferred material is obtained by contacting 3 parts of polyethylene imine with 20 parts of formaldehyde at room temperature.

PREPARATION EXAMPLE 138 g p-hydroxybenzoic acid was heated with 100 ml water and 100 g of 30% aqueous formaldehyde and 15 ml. conc. HCl at 98-100° C. for 2 hours. The initial white solid (p-hydroxybenzoic acid) dissolved and after about 1 hour, a white solid precipitated.

After cooling to about 60° C., 40% aqueous NaOH was added continuously until all the white precipitate had dissolved and the pH of the medium was 9.6-10. This solution was called A.

138 g p-hydroxybenzoic acid, 100 g of 30% aqueous formaldehyde were mixed together and 40% aqueous NaOH solution added until the initial solid dissolved and the pH was 9.6-10. This solution was called B.

Solutions A and B were mixed and refluxed for 20 minutes. A thick red syrup formed which on acidification with dilute HCl gave a white precipitate. This was filtered off and washed with water. It was partially dried at room temperature by sucking air through it using a vacuum pump.

A further condensation product was prepared by contacting a 3 wt % solution of diaminodiphenyl ether in methyl ethyl ketone with aqueous formaldehyde and heating to 70° C. for 30 minutes.

2 Phenol/Formaldehyde Condensate

The term 'phenol' in the context of phenol/formaldehyde condensate means monohydric phenols such as phenol, cresol and ethylphenol; polyhydric alcohols such as resorcinol and hydroquinone; bisphenols such as bisphenol A; and nuclear substitution products thereof. The term "aldehyde" means organic compounds having at least one—CHO group such as formaldehyde, acetaldehyde and furfural. In a preferred embodiment the condensation product consists of phenol and formaldehyde (or paraformaldehyde). The condensate can be made by conventional methods. Preferably the condensation product of phenol and aldehyde should not be in the form of macromolecules caused by curing but a primary condensation product of the first stage. In the first stage of the phenol-formaldehyde condensation a novolac resin is produced in the presence of basic catalyst and a resol resin in the presence of basic catalyst as primary product. The condensation product is preferably a resol which can be obtained as an aqueous solution. It can be made by adding the formaldehyde to an excess of the phenol in the presence of caustic soda, caustic potash, ammonia or amines.

When the condensation product is a novolac the product can be used is the form of an aqueous alkaline solution or a solution in an organic solvent such as methanol.

A modifier may be added. The condensation product is modified by heating after admixture with the modifier. For a resol-type product alkylphenols or dihydric phenols such as resorcinol, hydroquinone and bisphenol A can be used as the modifier. For novolac-type products aldehydes and hexamethylenetetramine can be used.

If the phenol-formaldehyde condensation product is of the resol type it should preferably be soluble in a 10 wt % caustic soda solution. Thus these two liquids should be mixed to form a liquid which is homogenous in any mixing proportions. The mean molecular weight of the condensation product which is soluble in 10 weight % caustic soda solution lies in a fairly wide range. It is however preferable to employ product of which the molecules have 1 to 20 benzene nuclei, and more desirably 5 to 10 benzene nuclei per molecule.

Preparation Example 94 g of phenol (1 mol.), 100 g of 48 wt % formalin (1.6 mol. of formaldehyde) and 2 g of caustic soda (0.05 mol.) were charged into a three-necked flask having a reflux condenser and then warmed to 85° C. 20 minutes with stirring. The mixture was kept at 85° C. for 3.5 hours for reaction and then concentrated until 75 wt % of solids component under reduced pressure at said temperature.

The viscosity of the resol obtained was measured in accordance with ASTM D 2196 using No. 4 spindle at 60 rpm and at 25° C. The value of 2,500 centipoises was obtained.

4 g of resorcinol was added to 50 g of the resol and then the mixture subjected to a temperature increasing up to 95° C. for 30 minutes with stirring. The mixture was kept at 95° C. for 10 minutes and the condensation product was diluted with 2 wt % caustic soda solution to 5 wt % as of solids component concentration.

Preparation Example 1128 g of phenol (12 mol), 1203 g of 48 wt % formalin (19.2 mol) and 60 g of 40 wt % caustic soda solution (0.6 mol) were charged into a three necked flask having a reflux condenser and then subjected to an increasing temperature up to 85° C. for 20 minutes with stirring. The mixture was kept under reaction for one hour at 85° C., and displayed a viscosity of 10 centipoise at a temperature of 80° C., in accordance with the aforementioned measuring method, using No. 1 spindle at 60 rpm.

This condensation product had a concentration of 74 wt % of solid component, and had been named as G2.

Preparation Example 1000 g of the condensation product G2 was charged into a three necked flask having a reflux condenser and 100 g of resorcinol was added thereto. The mixture was subjected to an increasing temperature up to 85° C. for 20 minutes with stirring and the condensation reaction continued at 85° C. During this process, four samples of 50 g each were obtained, which had the viscosity of 500, 1,000, 2,000 and 5,000 centipoises respectively, measured by the aforementioned measuring method, using No. 3 or No. 4 spindle at 60 rpm, at 80° C. They each contained 76 wt % solids.

Preparation Example 100 g each of the condensation product G2 was severally charged into two three-necked flasks having a reflux condenser, then 10 g hydroquinone was added to one of the flasks while 10 g of bisphenol A was separately added to the other. Each mixture was subjected to an increasing temperature up to 85° C. for 20 minutes and the condensation reaction continued at 85° C. until the viscosity reached 1,000 centipoises at 80° C. by the aforementioned method, using No. 3 spindle at 60 rpm. They each contained 76 wt % solids.

Preparation Example 18.8 kg phenol (200 mol.), 5.4 kg metacresol (50 mol.), 25.0 kg 48 wt % formalin (400 mol.) and 1.25 kg 40 weight % caustic soda solution (12.5 mol.) were poured into a reaction vessel having a reflux condenser and the reaction was carried out at a temperature of 85° C. The condensation reaction was kept at a temperature of 80° C. until the viscosity which based on the aforementioned measuring method using No. 3 spindle at 60 rpm reached 500 centipoises. The product contained 75 wt % solids.

Preparation Example 94 g phenol (1 mol.), 100 g 48 wt % formalin (1.6 mol. of formaldehyde) and 5.05 g (0.05 mol.) triethylamine were charged into a three necked flask having a reflux condenser and then heated to a temperature of 85° C. The mixture was kept at a temperature of 85 C until the viscosity reached 10 centipoise through the aforementioned measuring method, using No. 1 spindle at 60 rpm.

3 Naphthol and Formaldehyde Condensation Product

The condensation reaction between an effective 1-naphthol and formaldehyde is preferably effected in a base-catalysed reaction i.e. by condensing the effective 1-naphthol and formaldehyde in the presence of a base. The condensation may also (although less preferably from a practical viewpoint) be effected in an acid-catalysed reaction i.e. by condensation in the presence of an acid. In both of these cases, the condensation is conveniently conducted in an aqueous medium (which is alkaline or acid as the case may be). The structure of the condensates is not known but they are not believed to be resols or novolacs as these terms are conventionally applied to phenol/formaldehyde condensates prepared respectively by a base-catalysed reaction or an acid-catalysed reaction. Thus the spectral analysis by infra-red and nuclear magnetic resonance spectroscopy of the condensate prepared from 1-naphthol itself and formaldehyde under aqueous alkaline conditions, while complex and not capable of providing a definitive molecular structure, has indicated that the condensate contains no free methylol groups as would be expected if the product were a conventional early stage resol—although various types of methylene linkages are seen to be present (presumed to be attached to the 2 and 4 naphthalene nuclear positions, since 2 and 4 methylol groups are observed early on in the condensation, although these have disappeared in the final product). Moreover, molecular weight determination by ebulliometry indicates that only relatively small molecules containing up to three or four 1-naphthol-derived units, are present. Additionally, the 1-naphthol and formaldehyde appear to react together in substantially equimolar quantities to form the condensate (see later). Consequently, the absence of methylol groups, the result of the molecular weight determination, and the apparently equimolar reaction leads to the conclusion that the product in this case is probably a mixture of cyclic trimers and tetramers in which 1-naphthol-derived units are linked by bridging methylene groups at the 2 and 4 nuclear positions. Also, the achievement of a very similarly effective product using an acid-catalysed condensation (which is thought to be the same as or very similar to the product from the base-catalysed reaction) additionally points to these build-up suppressant products being quite different in structure to conventional phenol/formaldehyde condensates.

Alkaline aqueous solutions (where preparable) of these condensates are highly colored, often being deep blue, and it is thought that the deep coloration may be due to the presence of a small amount of a non-harmful (from the viewpoint of build-up suppressant activity) oxidation product.

The antifoul may be produced by first preparing an alkaline aqueous solution of the effective 1-naphthol/formaldehyde condensate (if soluble in aqueous alkali), which will usually be the direct or diluted solution from the base-catalysed reaction in an aqueous medium to form the condensate (the basic catalyst being e.g. aqueous NaOH, aqueous KOH, or aqueous $NH_4OH$ and the alkaline aqueous solution that is formed from the condensation being separated, if necessary, from any small amount of precipitate that sometimes tends to be produced), optionally containing an added surfactant to promote the surface-covering facility of the condensate, applying this alkaline solution to internal surfaces of the reactor (e.g. by spraying, painting, or flooding) and allowing a coating of the condensate to form. The application of the solution in this way will of itself (i.e. without anything further needing to be done, such as drying or rinsing—although these steps can be employed if desired) cause a tenaciously adherent coating of the condensate to be formed on the reactor surfaces; optionally however the solution applied to the reactor may also contain other useful substances, e.g. an added protective colloid, such as partially hydrolysed polyvinyl acetate, (incorporated e.g. by further diluting the solution with an aqueous solution of the protective colloid) in order to yet further enhance the adhesion of the coating.

When aqueous NaOH or KOH is used as the basic catalyst for the base-catalysed condensation it is preferable to employ 0.70 to 0.90 moles of NaOH or KOH per mole of an effective 1-naphthol (although other ratios can of course be used).

Where the condensation has been produced by an acid-catalysed reaction (the acid catalyst being e.g. aqueous HCl) an alkaline aqueous solution can be produced by first isolating the product, and then dissolving it in aqueous alkali such as aqueous NaOH or KOH solution.

Where it is possible to do so, it is preferable that this antifouling product be applied to the reactor internal surfaces as an alkaline aqueous solution, e.g. dissolved in aqueous alkali such as aqueous NaOH or KOH solution as mentioned above. This is in fact possible for most of these antifouling products which are usually soluble in aqueous alkali. However, where the coating product is insoluble in aqueous alkali, other means may be employed to effect the application of the coating product to the reactor internal surfaces; e.g. the product may be applied as a solution in an organic solvent—although this is not recommended for routine plant-scale operation due to the safety hazards that might be incurred.

It is to be understood that when the coating product is applied as a solution in aqueous alkali the product may be at least partly in the form of a salt.

By "an effective 1-naphthol" is meant a 1-naphthol which will condense with formaldehyde to form a coating product having build-up suppressant activity, i.e. a product that can be employed for the provision of an effective build-up suppressant coating. Many 1-naphthols will condense with formaldehyde to yield products having build-up suppressant activity, although it has also been discovered that not all 1-naphthols will yield a product having such activity. In general an effective 1-naphthol is a 1-naphthol in which both of the 2 and 4 nuclear positions are unsubstituted and in which the 3 nuclear position is unsubstituted or has a substituent which is not strongly electron withdrawing. As an example of a strongly electron withdrawing group one may particularly mention —$SO_2OH$. The numbering employed herein in respect of naphthalene nuclear positions is that recommended as definitive according to IUPAC rules, viz

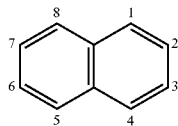

Preferably, the effective 1-naphthol is selected from those of formula

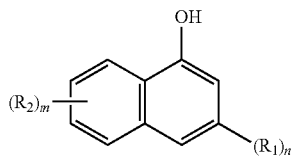

where n is 0 or 1; m is 0, 1, 2 or 3 (preferably 0, 1, or 2); $R_1$ and $R_2$ which may be the same or different are selected from halogen (preferably Cl), hydrocarbyl (preferably alkyl of 1-5 carbon atoms), hydroxyl, and hydrocarbyloxyl (preferably alkoxyl of 1-5 carbon atoms).

Examples of effective 1-naphthols include 1-naphthol, 1,3-dihydroxy-napththalene, 1,5-dihydroxy-naphthalene and 1,7-dihydroxy-naphthalene.

Most of these condensation products (and particularly their alkaline aqueous solutions) may be stored for long periods without any significant deterioration in effectiveness provided precautions are taken to allow only limited access to oxygen; it is believed that an unlimited access to oxygen over a prolonged period allows the gradual build-up of oxidation products, usually manifested by substantial precipitation in the alkaline aqueous solution.

Of the effective 1-naphthols, 1-naphthol itself is the most preferred on account of its cheapness, ready commercial availability, and effectiveness.

When condensing the effective 1-naphthol and formaldehyde to form a coating product for use in the invention, it is believed that the effective 1-naphthol and formaldehyde react together in substantially equimolar quantities in order to form the product, with any molar excess of 1-naphthol used remaining unreacted and any molar excess of formaldehyde used reacting further with the product thereby lowering its yield.

Accordingly, as far as the formation of the condensation product is concerned, the ratio of the quantities of effective 1-naphthol and formaldehyde which are admixed for the condensation is not believed to be particularly critical since an equimolar reaction is considered to occur. However, when a significant excess of one or other reactant is used, the coating product may, for the purposes of some polymerisation recipes, be associated with an undesirable quantity of a contaminant (in that a deleterious effect may be incurred), and it may sometimes (according to the condensation method used to prepare the coating product) be uneconomic or difficult to remove enough of the contaminant to avoid the deleterious effect. Thus, if one departs from the admixture of substantially equimolar quantities of effective 1-naphthol and formaldehyde for the condensation then the vinyl chloride polymerisation itself may sometimes be deleteriously affected particularly if a dialkyl peroxydicarbonate is employed as the polymerisation initiator. Polymerisations which use other initiators, e.g. lauroyl peroxide and azo compounds, are found to be much less sensitive to the 1-naphthol/formaldehyde ratio. Generally speaking in such cases, the admixture for the condensation of an effective 1-naphthol and formaldehyde in a molar ratio range of 1.1/1.0 to 1.0/1.2, particularly 1.05/1.0 to 1.0/1.1, is suitable. The most preferred molar admixture ratio is substantially 1.0/1.0.

Preparation Example 1

Condensation products of use in the invention were prepared (on various scales) from 1-naphthol and formaldehyde in base-catalysed reaction using the following generalised recipe.

1-Naphthol (x mole) and NaOH (between 0.7 x and 0.85 x mole, normally 0.80 x mole) as a 1 molar aqueous solution were charged to a reaction vessel and heated to 70° C. Formaldehyde (y moles, y usually being equal to x) as a 38% w/v aqueous solution was added dropwise with stirring during which the rate of addition was controlled to only allow a temperature rise of from 70° C. to 80° C. No external heating was required during the addition (exothermic). When all the formaldehyde solution had been added the contents of the reaction vessel were heated to reflux at 90° C. and refluxed for 30 minutes. The resulting alkaline solution of the coating product (blue in color), having an estimated product concentration of about 20% w/v, was used, either neat or diluted, in the invention. Whether neat or diluted, the alkaline solutions typically had a pH of between 11-13.

Preparation Examples 2 and 3

Alkaline condensate solutions were prepared using substantially the recipe of Preparation Example 1, but in place of 1-naphthol itself the following substituted 1-naphthols were employed:
Preparation Example 2: 1,3-dihydroxy-naphthalene; scale 0.025 molar; color of condensate solution deep red
Preparation Example 3: 1,7-dihydroxy-naphthalene; scale 0.25 molar; color of condensate solution deep green Preparation Example 4

The same procedure of Preparation Example 1 was followed initially (on a 0.25 molar scale) but in place of 1-naphthol itself there was used 1,5-dihydroxy-naphthalene. After the reflux period a black precipitate had formed. It was insoluble in aqueous NaOH solution but soluble in organic solvents such as acetone.

Preparation Example 5

A coating product for use in the preparation of a build-up suppressant coating according to the invention was produced using an acid-catalysed reaction as follows. 1-Naphthol (36 g, 0.25 mole) was stirred in 180 ml of 1 molar aqueous HCl solution at 70° C. Formaldehyde (19.75 ml of a 38% w/v aqueous solution, 0.25 mole) was added and the stirred mixture heated to reflux. After a few minutes, a hard red/brown lump was formed. This material was removed, washed clean of acid, dried and crushed to a fine powder. The powder was dissolved in 180 ml of a 1 molar aqueous NaOH solution to give a deep blue alkaline solution, very similar to that from Preparation Example 1, having an estimated product concentration of 20% w/v.

Preparation Example 6

The procedure of Preparation Example 1 was substantially followed for the preparation of a coating product according to the invention (derived from 1-naphthol and formaldehyde) on a very large scale where $x=1.11\times10^{3}$ and $y=1.12\times10^{3}$.

4 Naphthenic Molecules Substituted with Sulfur

These materials include a naphthalene skeleton according to the arrangement:

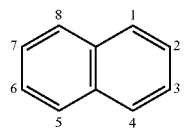

substituted in at least one of positions 1 to 8 with a sulfur containing radical characterized by the fact that it includes at least one atom of sulfur (S) in at least one of these radicals.

In the antifouling material there is a substantial presence of sulfur and it does not represent an impurity; therefore the sulfur content must be higher than 0.25% in weight, preferably higher than 0.85%, the optimal percentage being 9.3%.

Advantageously, the sulfur radical can be bound to oxygen (O). Just as advantageously, the radical is characterized by the presence of $SO_n$ where n may be 2 or 3. More preferably the radical is characterized by the presence of the $SO_nNa$ group, where n may be 2 or 3.

Good activity is obtained by adding to a naphthenic structure, sulfonic and sulfinic radicals which can be in sodium salt form such as —$CH_2SO_nNa$ as a single radical in positions 2, 3 or 4 of the naphthenic structure or in the formulation —$CH(SO_nNa)$— if it binds two of these structures.

Preferred examples include

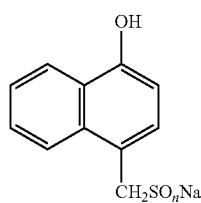

where n can vary from 2 to 3.

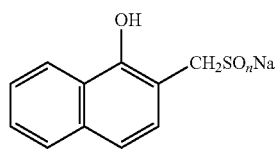

where n can vary from 2 to 3.

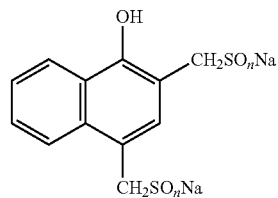

where n can vary from 2 to 3.

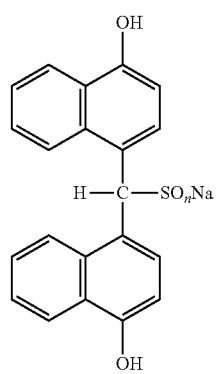

where n can vary from 2 to 3.

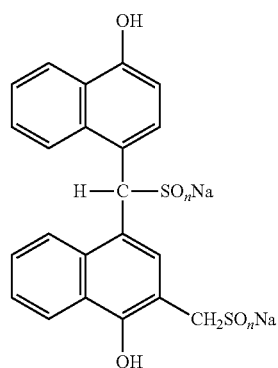

where n can vary from 2 to 3.

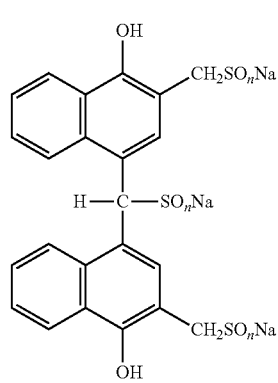

where n can vary from 2 to 3.

Formation of the Antifoul Product:

These materials can be obtained by reaction of a product having naphthenic (aromatic) structure, such as for example of the alphanaphthol type, with sodium hydroxymethanesulfinate CAS number 149-44-0 (6035-47-8 as the dihydrate).

The sodium hydroxymethanesulfinate reacts with alphanaphthol in the weight ratio of 1 to 1.5, in a 10 to 50% water solution and bringing the solution to a temperature between 40° C. and 100° C. in nitrogen atmosphere and in an alkaline environment (pH 11-13), forming the new product according to the present invention.

The solution of the product thus obtained is light and clear but in the presence of oxygen it slightly oxidizes, turning to a bluish color. If the contact with oxygen is interrupted, the product turns back to its original light transparent aspect.

The reason for the reversible color change may be due to the presence of sulfinic or sulfonic functionality.

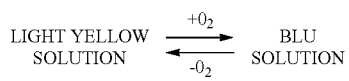

The product may also be made by replacing the sodium hydroxymethanesulfinate with sodium hydroxymethylsulfonate CAS No.: 870-72-4. Alternatively one can also make formaldehyde react with sodium dithionite CAS No. 7775-14-6 and then react the resulting product with a naphthenic skeleton containing material such 1-naphthol.

Preparation Example

In a 8000 liter stainless steel reactor, equipped with an anchor agitator with speed ranging from 20 to 40 rpm is loaded with 1200 kg water, 180 kg of a 30% NaOH solution, 270 kg of 1-naphthol under a rigorous nitrogen flow.

The temperature is brought to 90° C. and over the course of 2 hours 900 kg of a 31.5% w/w sodium hydroxymethanesulfinate solution in water is added.

The solution is kept at 90° C. for 12 hours and then 190 kg of a 30% NaOH solution in water is added are added resulting in a clear, yellow solution.

The Binder

The binder is an acrylate polymer. It may be an acrylic acid homopolymer or a copolymer or esters of acrylic acid. Copolymers with styrene such as styrene-acrylic acid ester copolymers are preferred. Examples of styrene-acrylic acid ester copolymers are those of CAS number: 25767-47-9 such as: 2-Propenoic acid, butyl ester, polymer with ethenylbenzene, acrylic acid butyl ester, polymer with styrene (8CI); Benzene, ethenyl-, polymer with butyl 2-propenoate (9CI); Styrene, polymer with butyl acrylate (8CI); 290D; 95J-APR7446; AC 80; ACR 1555; Acronal 230D; Acronal 290D; Acronal 295D; Acronal 296D; Acronal 320D; Acronal 4D; Acronal 725S; Acronal NX 4748X; Acronal NX 4787; Acronal NX 4787X; Acronal PR 8689; Acronal S 305D; Acronal S 430P; Acronal S 559; Acronal S 702; Acronal S 728; Acronal S 760; Acronal S 790; Acronal V 271; AcryGen 4096D; AcryGen 4660; Acrybase ZSR 1005; Akroplen 2; Almatex CPR 100; Axilat DS 910; BB 01; BN 0107; Basoplast PR 8152; Behenyl behenate-butyl acrylate-styrene copolymer; Butyl acrylate-styrene copolymer; Butyl acrylate-styrene polymer; CPR 100; CPR 250; CPR 300; CS 40; CS 40 (low profile additive); Cevian A 46701; Craymul 2423; DL 420; DM 60; Dow Latex DL 420; Elotex BN 0107; Ercusol A 5250; FSR 051; FSR 053; Finndisp A 10; Finndisp A 6000; Fulatex PN 3716G; GD 86B; Hexatec H 658-81; Himer SB 101; Himer SB 305; KD 350; KEY 1000; LL 990; Lenteks A 7; MK 9472; MP 1SM631G; Mowilith DM 60; Nikalite X; PA 805; PSB 2700; PSB 2931; Piccotoner 1221; Piccotoner 1278; Pliolite Ultra 100; Pliotone 2102; Pliotone PTR 7767; Poly(butyl acrylate-styrene); Polyform IV; Primal EP 4030; RCI-2671; RCS 1-33; RP 70; RP 70 (acrylic polymer); Rhodopas DS 910; Rhodopas GS 125; Rhoplex EP 4030; Rhoximat DS 910; Robond 6114; S 559; S 790; SABU; SB 101; SC 001; SC 008; Sokrat 4924; Sokrat LX 75; Styrene-butyl acrylate copolymer; Styrene-butyl acrylate polymer; Styrene-n-butyl acrylate copolymer; Styrene-n-butyl acrylate polymer; TL 3; TL 3 (polymer); TSF 2; TSF 2 (polymer); Texicryl 13-092; Texicryl TD 6213; Ucar 123; Ucar 481; Ucar DL 420G; Uramul SC 70; V 271; Vinnapas LL 512; Vinnapas LL 9400; Vinnapas LL 990; XPA 4165; n-Butyl acrylate-styrene copolymer; n-Butyl acrylate-styrene polymer. A particular suitable polyacrylic ester (co)polymer is ACRONAL 290D which is obtainable from BASF. Other acrylates may include CAS Registry Number: 25686-45-7,2-Propenoic acid, polymer with butyl 2-propenoate and 2-propenenitrile Acrylic acid, polymer with acrylonitrile and butyl acrylate (8CI); 2-Propenenitrile, polymer with butyl 2-propenoate and 2-propenoic acid (9CI); 2-Propenoic acid, butyl ester, polymer with 2-propenenitrile and 2-propenoic acid (9CI); Acrylic acid butyl ester, polymer with acrylic acid and acrylonitrile (8CI); Acrylonitrile, polymer with acrylic acid and butyl acrylate (8CI); Acronal A 378; Acrylic acid-acrylonitrile-butyl acrylate copolymer; Acrylic acid-acrylonitrile-butyl acrylate polymer; Acrylic acid-butyl acrylate-acrylonitrile copolymer; BNK 206; BNK 246; BNK 306; BNK 406; Butyl acrylate-acrylonitrile-acrylic acid copolymer; Butyl acrylate-acrylonitrile-acrylic acid polymer; HTR 280DR; JSR-PAR 1H; Rikabond ET-L 924-1. Another particular suitable acrylate is Acronal A378. Other copolymers that may be suitable are acrylic acid hydroxypropyl, acrylic acid hydroxyethylester, acrylate copolymers of CAS number 25133-97-5, acrylates/hydroxyesters acrylates copolymers, acrylates/VA copolymers of CAS 25067-02-1. Mixtures of these materials may also be used. The polyacrylic ester (co)polymer is preferably a water-based acrylic dispersion and film forming (co)polymer.

Typically the weight ratio of condensation product or sulfur substituted 1-naphthol; to binder such as polyacrylate ester (co)polymer is in the range of 3:1 to 30:1 for example 5:1 to 15:1 such as about 10:1.

Conveniently the composition of the invention can be prepared by blending a mixture of the antifouling composition in water with the binder eg polyacrylate composition in water to give a composition of the invention. Preferably the composition of the invention has a pH in the range 9 to 14 preferably 10 to 14, viscosity in the range of 1-10 mPas preferably 1 to 5 and dry solid content is in the range of 1-20 wt % preferably 1 to 10.

Viscosity is measured by the following protocol:
1. Equipment
   1.1 Haake Viscometer model 7L Plus equipped with a complete spindles set.
   1.2 Haake Low viscosity adapter spindle set
   1.3 Thermostatic bath capable of being controlled at 23° C.±1.
   1.4 Thermometer, precision 1° C.
   1.5 Stopwatch.
   1.6 Common laboratory glassware.

2. Procedure
2.1 Switch on the viscometer and let it to auto zero following the displayed instruction.
2.2 Select the following conditions using the instrument control display:

| Spindle: | n° | LCP |
|---|---|---|
| rotor speed: | rpm | 60 |
| measure mode | | mPa·s |

2.3 In a measuring cylinder, pour 20 ml of sample. Pour this sample into the low viscosity tube adapter. Place the tube into the collar/bath. Allow the sample to reach the temperature of 23° C. (±1).
2.4 Place the spindle into the sample (be careful to eliminate all the air bubbles) and connect it to the viscometer. Take care when connecting the spindle.
2.5 Check that the spindle is immersed to the correct depth and that the viscometer levelling bubbles is centred: adjust if necessary.
2.6 Start the viscometer motor and the stopwatch at the same time. Wait 20 seconds and then read the viscosity value and the torque directly from the instrument display.
3. Results.
The Haake viscosity value is expressed in mPa·s. The value is directly available from the instrument display.
4. Accuracy of the Determination.
±10%

Dry solid content is measured using the following protocol:
1. Equipment.
1.1 Air circulation oven.
1.2 Analytical balance (accuracy: 1 mg).
1.3 Common laboratory glassware.
2. Procedure
Each determination must be done twice.
2.1 Weigh a cleaned, flat glass container (10 cm diameter ca.) and note down the weight (P1).
2.2 Weigh 1 to 2 g. of sample into the container; note down the weight (P2).
2.3 Put the container into the oven at 150° C. Let the solvent evaporate for 30 minutes.
2.4 Take out the container from the oven and let it to cool down into a dessicator for at 15 minutes.
2.5 Weigh the container with the solid matter (P3).
3. Results.
The result is expressed as % of solid content:

(P3−P1)/(P2−P1)×100% solids where (P3−P1)=dry matter amount in g.
(P2−P1)=sample amount in g.
4. Accuracy of the Determination.
±1% (Relative)

Where the composition of the invention has properties within these ranges storage stability, handling and ease of application such as to enable spraying the anti-fouling agent to the reactor wall are especially good.

Other materials can be present. For example one or more of antioxidants, chelating agents, antifoaming agents, surface tension reducing agents, stabilisers and pH regulators. They are discussed in more detail hereinafter. It will be appreciated that one may select none, one or more than one material from each group in any compatible combination.

The antifouling composition can be susceptible to oxidation. Oxidation can impart undesirable color to the resulting product. In order to reduce oxidation the composition of the invention can be prepared and stored under low concentrations of molecular oxygen. For example the composition can be prepared and stored under nitrogen. Oxidation can also be reduced by addition of an antioxidant. Preferably, the amount of antioxidant is selected such as that the final color of the product does not change when exposed to air for at least 30 minutes. Antioxidant is not however essential. In the absence of antioxidant the composition of the invention tends to be a blue milky emulsion and in the presence of antioxidant tends to be a green milky emulsion. While the composition can be used in the absence of antioxidant it may be preferred to use antioxidant as this may further reduce the occurrence of dark colored coating material present in the white PVC polymer when the coating is peeled off the reactor. The improved binding of the antifouling agent to the reactor wall, when used with the polyacrylic binder, also reduces the occurrence of anti-fouling coating peeling off the reactor wall and contaminating the white PVC polymer with any colored material thereby reducing the need for use of antioxidant.

In some embodiments of the invention chelating agents such as EDTA may be present and these too may serve to enhance color stability.

In some embodiments of the invention antifoaming agents are present. Those skilled in the art will have no difficulty in selecting suitable antifoaming agents. An example of a suitable antifoaming agent is ethanol. Those skilled will have no difficulty in selecting other suitable antifoaming agents In some embodiments of the invention stabilisers may be present. In addition to materials stabilising the composition against oxidation and color change other stabilisers can be present. By way of non-limiting example they can include storage stabilisers effective to reduce sedimentation or phase separation or freeze-thaw stabilisers. Examples of stabilisers include xanthan gums, nansa (ie alkylbenzenesulfonic acids and salts), alcohols such as methanol and isopropanol, and partially hydrolysed polyvinyl acetate "PVA". Formulations prepared with Styrene, polymer with butyl acrylate such as Acronal 290D were found to provide especially good storage stable formulations in conjunction with the antifouling materials.

This composition can be in one pack form where all the ingredients are mixed together or in multipack form for example two pack form where the binder is in a first pack and the other ingredients are in a second pack. Two-pack form is especially useful for compositions with limited storage stability.

While PVA which term embraces polyvinyl acetate and partially hydrolysed polyvinyl acetate has been used as an antifouling agent and can be used in the composition of the invention it is not especially preferred since it has surprisingly been found to often reduce adherence to the reactor walls. In addition, preparation of a PVA solution requires heating water to dissolve the PVA solid and increases the manufacturing time and cost whereas the preferred polyacrylate (co)polymer can be used "as is". Where PVA is present it will typically comprise less than 10 wt % of the composition, such as less than 5 wt %, for example less than 2 wt % such as less than 1 wt % such as less than about 0.5 wt % PVA, for example 0.4 wt % such as 0.3 wt % or 0.2 wt % or less. In some embodiments the antifouling composition is substantially free of PVA. It is however to be clearly understood that low or no PVA content is preferred only in the antifouling composition. Polymerisation of VCM is generally undertaken in the presence of PVA as both a primary and secondary suspending agent but polymerisation takes place. As explained hereinafter after application of the composition of the invention to surfaces takes place before polymerisation is undertaken and before the VCM and attendant PVA is introduced into the reactor.

In another aspect of the invention there is provided an antifouling composition which contains an acrylate polymer such as a polyacrylate ester copolymer and at least one of (i) a cross-linked product formed by reacting formaldehyde and a phenol, (ii) a phenol/formaldehyde condensate, (iii) a condensation product formed by reaction of 1-naphthol and formaldehyde, and (iv) a product based on naphthenic molecules substituted with sulfur compounds at at least one position on the aromatic structure but less than 2.0 wt %, for example less than 1.0 wt % such as less than 0.5 wt % of PVA. This composition can be in one pack form where all the ingredients are mixed together or in multipack form for example two pack form where the acrylate polymer is in a first pack and other ingredients selected from (i) to (iv) are in a second pack.

Those skilled will have little difficulty in devising methods of producing the composition of the invention. For example a solution or dispersion of the at least one of (i) a cross-linked product formed by reacting formaldehyde and a phenol, (ii) a phenol/formaldehyde condensate, (iii) a condensation product formed by reaction of 1-naphthol and formaldehyde, and (iv) a product based on naphthenic molecules substituted with sulfur compounds at at least one position on the aromatic structure is formed and the polyacrylate ester (co)polymer is added for example as a water solution while maintaining the pH of the mixture at at least pH 9. In preferred embodiments an antioxidant is added to the solution before addition of the polyacrylate ester (co)polymer. Other components such as antifoaming agents can be added before or after the polyacrylate ester (co)polymer.

Generally the polyacrylate ester (co)polymer will comprise 0.5-10 wt % of the antifouling composition.

The composition of the invention is applied to reactor surfaces prior to a polymerisation reaction. The precise manner of application is not of the essence of the invention and could for example be by spraying, painting or flooding. In some embodiments of the invention application is undertaken in the presence of steam. In some embodiments of the invention the composition of the invention is subjected to a drying step but neither steam nor drying are essential. The amount of the coating product to be employed is not too critical, although the coating should not be too heavy (to avoid any possibility of tainting the polymer) nor so light that effective build-up suppression is not achieved; obviously such limits will vary considerably according to various factors (e.g. the tendency of the polymerisation recipe to incur build-up formation to a lesser or greater extent—particularly in terms of the initiator employed, and the quality of the reactor surfaces). Generally speaking, it is normal to apply a volume of coating product (e.g. by spraying, painting or flooding-usually by spraying in large-scale operations) of appropriate concentration which volume is sufficient to evenly coat the reactor internal surfaces; this will of course vary according to the size of the reactor. It has been found convenient to apply a dispersion of low to moderate concentration to the reactor surfaces and to apply as little as possible concomitant with achieving acceptable surface coverage and an effective coating weight appropriate to the reactor/polymerisation recipe being employed; the efficiency of the application equipment (usually a spraying apparatus) will of course determine to some extent the minimum amount of dispersion that can be employed. (Also it is to be appreciated that the amount of coating product actually applied may be greater than that finally remaining on the reactor surfaces due to losses incurred through e.g. draining.)

In other embodiments of the invention the components are kept separate. In a first step a solution or suspension of the polyacrylate ester copolymer is applied to the reactor walls for example as hereinbefore described. This material is allowed to drain or dry. Subsequently a conventional antifouling composition for example as described in WO97 08 210, GB 1 439 339, JP 54 107 991 or EP 0 052 421 can be applied for example as hereinbefore described and allowed to drain or dry.

The composition of the invention produces a tenaciously adherent antifouling coating on treated surfaces. In many cases the coating will retain its antifouling properties through several such as 3 or more, 4 or more or 5 or more or 6 or more such as 10 VCM polymerisation processes.

The composition of the invention may also be used for other functionalities such as an anti-corrosion agent or as a fire-retardant. Typically, older reactors may suffer from a combination of polymer fouling and corrosion. The composition of the invention preferably comprises the combination of the condensate, an antioxidant, metal-chelating agent and the acrylate. While we do not wish to be bound by this theory the condensate is believed to limit the rate of corrosion by scavenging highly oxidative radicals, the antioxidant can lower the oxidation state of redox active metal centres, the metal-chelating agent binds to the metals and making these less redox-active and the acrylate will facilitate the formation of a protective film. Furthermore, the components have different chemical properties such as pH dependency (pKa) and water solubility but we have found surprisingly that by carefully controlling the pH, the order of addition and lowering the amount of PVA (during preparation of the antifouling agent) it is possible to form a stable solution.

The composition of the invention is preferably used for preventing corrosion or fouling in polymerisation reactions but may also be used for a wide range of other applications; for example, coatings to protect underwater surfaces of ships.

The process for the polymerisation can be any manufacturing process for the polymerisation of a vinylic monomer. Suitable processes may include processes for the manufacture of polychloroprene, suspension polystyrene and acrylonitrile-butadiene-styrene (ABS), high impact polystyrene, expanded polystyrene (EPS), styrene-acrylonitrile copolymers, methylmethacrylate-butadiene-styrene, nitrile-butadiene rubber, polystyrene, polybutadiene, polyacrylonitrile, poly-methylmethacrylate, vinyl acetate ie "VAM" copolymers, and vinyl acetate/vinyl chloride copolymers. Processes for the manufacture of polychloroprene, suspension polystyrene, and acrylonitrile-butadiene-styrene (ABS) are preferred.

Suitable polymerisation reaction conditions are preferably those processes wherein the reaction temperature is from 40 to 200° C. Temperatures from 40 to 100° C. are more preferred.

Suitable processes are batch or continuous processes. Batch processes are preferred.

The polymerisation pH range may be from pH 2 to 14. Preferred reaction pH is less than 8.

The polymerisation is by any number of free radical polymerisation methods for example, bulk, solution, gel, suspension or emulsion polymerisation. Suspension is preferred.

The vinylic monomer(s) may be selected from styrene, ethylene, propylene, butadiene, isoprene, vinyl acetate, vinyl chloride, vinyl pyrrolidone, vinyl caprolactam, tetrafluoroethylene, vinylidene chloride, vinyl sulfonic acid, acrylonitrile, methacrylonitrile, vinyl methyl ether, vinyl cyclohexane, acrolein, vinyl butyl sulfide, vinyl ethyl ketone, vinyl pyridine, allyl acetate, allyl alcohol, allyl amine, maleic acid, maleic anhydride.

The process for the polymerisation of polymerisable monomer is most preferably a process for polymerisation of vinyl chloride. By "polymerisation of vinyl chloride" is meant the homopolymerisation of vinyl chloride, the copolymerisation of vinyl chloride with one or more comonomers copolymerisable therewith, or the polymerisation of vinyl chloride in the presence of preformed polymers (optionally in the presence of grafting agents) to form graft-type vinyl chloride polymers. Examples of comonomers (copolymerisable with vinyl chloride) include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, .alpha.-olefins such as ethylene and propylene, vinyl ethers and styrene compounds. Examples of pre-formed polymers for forming graft-type vinyl chloride polymers include acrylic ester polymers such as poly-n-butyl acrylate, methyl methacrylate homo- and copolymers, poly-2-ethylhexyl acrylate, and olefin/vinyl ester copolymers such as ethylene/vinyl acetate copolymers. It is preferable to apply the invention to the production of polymers containing at least 50% molar and more particularly at least 80% molar, of units derived from vinyl chloride.

The process of the invention is particularly useful when applied to the production of vinyl chloride/vinyl acetate copolymers containing 3-20% molar of vinyl acetate units, since it is in any case often extremely difficult when using known build-up suppressants to obtain a consistently build-up free process for making such copolymers.

Any suitable suspension agent may be used for polymerisation in aqueous suspension according to the invention. With reference to vinyl chloride polymerisation, particularly preferred suspension agents are polyvinyl acetates of various degrees of hydrolysis and water-soluble cellulosic esters. These suspension agents can be used together with secondary suspension agents if desired. The amount employed may vary widely and is generally between 0.05 and 1.5% by weight calculated on vinyl chloride used.

Any suitable free-radical polymerisation initiator that is monomer-soluble may be used for polymerisation in aqueous suspension. With reference to vinyl chloride polymerisation, particular examples include peroxy compounds such as di-tertiary butyl peroxide, lauroyl peroxide and acetyl cyclohexyl, sulfonyl peroxide, azo compounds such as azo-bis-isobutyronitrile and 2,2'-azo-bis-2,4-dimethylvaleronitrile. Monomer-soluble free-radical polymerisation initiators that are particularly suitable for use in polymerisation of vinyl chloride are the dialkyl peroxydicarbonates (the term "alkyl" including "cycloalkyl") whose alkyl radicals contain up to 20 carbon atoms, such as diethyl peroxydicarbonate, di-isopropyl peroxydicarbonate, dicetyl peroxydicarbonate, and bis(4-tertiarybutylcyclohexyl)peroxydicarbonate, and azo compounds such as 2,2'-azo-bis-2,4-dimethylvaleronitrile and azo-bis-isobutyronitrile. These initiators may be used in conventional quantities—generally speaking from 0.01 to 1% by weight calculated on vinyl chloride used.

The operating conditions for polymerisation according to the present invention may be those customarily used for the relevant polymerisation. For example, for vinyl chloride polymerisation the polymerisation temperature is generally in the range 40° C. to 80° C. and the pressure generally below 20 kg/cm$^2$.

As used herein

"Vinylic monomer" means a monomer containing one or more polymerizable carbon-carbon double bonds.

"Preventing" means both preventing and inhibiting.

"Fouling" means undesired polymerisation such that the polymer precipitates on reactor walls or fouls process equipment leading to equipment shutdown and cleaning requirement for removal of the polymeric foulant.

Fouling may also include other types of undesired polymerisation such as "popcorn" formation. In the production of an olefin, a so-called popcorn polymer of a porous three-dimensional structure occurs accidentally and not infrequently in the apparatus owing to the polymerization of the olefin in the step of refining and recovery or in the step of recovering the unaltered monomer after termination of the polymerisation. This popcorn polymer occurs both in the gaseous phase and the liquid phase. The popcorn polymer is disposed to forming "seeds" which may continue to propagate. The popcorn polymer therefore adheres to and defiles the heat-exchanger, distillation tower, and piping installed within the system for refining and recovering the produced olefin and deteriorates the efficiency of the refining operation. It often clogs the apparatus and its piping. In an extreme case, the mechanical pressure generated during the propagation of the polymer may deform and fracture the apparatus. The reason for the rapid propagation of the popcorn polymer is that, as the polymer grows, radically active sites are newly formed inside the polymer and the polymer attains growth from the newly formed radically active sites.

Particular embodiments of the invention will now be discussed by way of non-limiting reference to the Examples.

Example 1 a) 33.3 g of 20 wt % solids content an alkaline aqueous solution and a pH of 13 of the anti-fouling agent (Polycondensate) was prepared from the reaction of 1-naphthol and formaldehyde as described in Preparation Example 1 above to give a dark green solution.

b) Polyacrylic ester copolymer (Acronal 290D ex BASF supplied as an aqueous dispersion of solid content of 49-51 wt %) was diluted with water from 50% to a 2 wt % solution and 33.3 g of the 2 wt % solution added to 33.3 g of the mixture of step (a). The mixture formed a milky emulsion.

c) PVA powder (of 99% hydrolysis) was dissolved in water at 90° C. for 2 hours to give a 2.7 wt % solution and allowed to cool down to room temperature. The PVA solution (33.3 g) was then added to the mixture of step (b).

To minimise the presence of oxygen the reactions were performed under nitrogen.

Composition of Example 1:

Polycondensate 6.6 wt %, Acronal 290D 0.67 wt %, PVA 0.9 wt %

Example 2

Example 1 was repeated but without the addition of PVA. The solution was made up to a total of 100 g by addition of extra water Composition of Example 2:

Polycondensate 6.6 wt %, Acronal 290D 0.67 wt %

Example 3

Comparative

Example 1 was repeated but without the addition of: PVA, or Acronal.
Composition of Example 3:
Polycondensate 6.6 wt %,

Example 4

Comparative

Example 1 was repeated but without the addition of Acronal.
The solution was made up to a total of 100 g by addition of extra water
Composition of Example 4:
Polycondensate 6.6 wt %, PVA 0.9 wt %
Anti-Fouling Agent Performance Testing Procedure.

The anti-fouling agents were coated onto a stainless steel plate representative of the internal surface of a reactor. A uniform coating was obtained with good adhesion to the surfaces shown by a lack of material running down the plate.

The plates coated with the anti-fouling agent were then placed inside the reactor against the reactor wall.

Polymerisation of vinyl chloride in aqueous suspension was then performed in the reactor. After termination of the polymerisation the reactor was vented and the polymer slurry discharged.

The metal plates were then removed from the reactor and inspected for any build-up of PVC polymer and placed back in the reactor (after the reactor was washed with water). The % Coverage anti-fouling agent and PVC build up coverage % was determined by visual assessment.

A $2^{nd}$ polymerisation reaction was then started. Hence, a total of up to 5 polymerizations were performed and the following measurement was performed.
Results It is clear from these results that the composition of the invention is remarkably better than prior art compositions in which the polyacrylate ester is absent. In addition, the results demonstrate that the polyacrylate binder performs better in the absence of PVA. This difference is commercially desirable since it increases availability of the reactors by not only the time it takes to add antifouling composition to the reactor but also the time the reactor has to be allowed to stand to allow excess antifouling composition to drain away. This can be of the order of 2-5% reduction in reactor cycle time per batch, for example 7-10 min saving per 360 min of reactor cycle time.

This can also lead to an overall increase in productivity. For example the productivity in terms of down time when the reactor is not out of operation for antifouling recoating, antifouling drain and reactor cleaning can be greater than 90% for a series for example of 2, 3, 4, 5, 6, 7, 8, 9, 10 or more consecutive polymerisation batches It is furthermore found that the PVC obtained using the composition of the invention is whiter the B* yellow index method than PVC obtained by polymerising VCM in reactors treated with prior art antifouling compositions. The whiteness of the PVC color as measured by the B* yellow index method for the PVC wet cake is typically reduced by 50% and may also improve the color of the waste water.

In addition, we have found that the presence of the polyacrylate (co)polymer increases the stability to the presence of oxygen (ie a reduced rate of color change to a dark-blue solution typically observed with 1-naphthol and formaldehyde condensate). This is turn provides a further contribution to the benefit of increased whiteness in the white PVC dried polymer and makes the process less sensitive during the bottling or packaging of the antifoul composition.

Other acrylate copolymers have also been tested using the methods as above. Acronal A378, a copolymer with acrylonitrile and butyl acrylate, was found to also improve the retention of the anti-fouling agent on the reactor wall and reduce PVC build-up.

TABLE 1

Retention of Anti-fouling agent after 5 repeat polymerisations

% Coverage anti-fouling agent

| Example | Polymerisation 1 | Polymerisation 2 | Polymerisation 3 | Polymerisation 4 | Polymerisation 5 |
|---|---|---|---|---|---|
| 1 | 100 | 60 | 50 | 40 | 40 |
| 2 | 100 | 90 | 90 | 90 | 90 |
| 3 | 90 | 40 | 20 | 10 | 5 |
| 4 | 80 | 50 | 40 | 30 | 30 |

TABLE 2

PVC build up on plates after 5 repeat polymerisations

PVC build up coverage %

| Example | Polymerisation 1 | Polymerisation 2 | Polymerisation 3 | Polymerisation 4 | Polymerisation 5 |
|---|---|---|---|---|---|
| 1 | 0 | 5 | 5 | 20 | 50 |
| 2 | 0 | 0 | 0 | 0 | 0 |
| 3 | 5 | 10 | 20 | 50 | 55 |
| 4 | 0 | 5 | 10 | 45 | 50 |

The invention claimed is:

1. A composition comprising
   a) at least one poly acrylate (co)polymer binder and
   b) at least one of
      (i) a condensation product formed by reaction of an effective 1-naphthol and formaldehyde; and
      (ii) a naphthalene molecule substituted in at least one of positions 1 to 8 with a sulfur-containing radical; and
   wherein the weight ratio of:
      the condensation product formed by reaction of an effective 1-naphthol and formaldehyde or the naphthalene molecule substituted in at least one of positions 1 to 8 with a sulfur containing radical,
      to the poly acrylate (co) polymer binder, is in the range of from 3:1 to 30:1.

2. A method of preventing fouling of a reactor for polymerization of polymerizable monomers, comprising coating internal surfaces of said reactor with the composition as claimed in claim 1.

3. A method of preventing or reducing corrosion of a reactor for polymerization of polymerizable monomers, comprising coating internal surfaces of said reactor with the composition as claimed in claim 1.

4. The composition as claimed in claim 1 wherein the binder is a polyacrylic ester (co)polymer selected from the group consisting of: Behenyl behenate-butyl acrylate-styrene copolymer; Butyl acrylate-styrene copolymer; and Acrylic acid-butyl acrylate-acrylonitrile copolymer.

5. A method of polymerisation of polymerisable monomers, comprising coating internal surfaces of a polymerization reactor with the composition as claimed in claim 1, and carrying out polymerisation of said polymerizable monomers in the polymerisation reactor having said composition coated on said internal surfaces thereof.

6. A method of producing an antifouling composition as claimed in claim 1 comprising the steps of:
   a) providing a solution or dispersion in water of at least one of:
      (i) a condensation product formed by reaction of 1-naphthol and formaldehyde, and
      (ii) a naphthalene molecule substituted in at least one of positions 1 to 8 with a sulfur-containing radical; and
   b) adding a binder; while
   c) optionally maintaining the pH of the mixture above pH 9; and
   wherein the weight ratio of:
      the condensation product formed by reaction of an effective 1-naphthol and formaldehyde or the naphthalene molecule substituted in at least one of positions 1 to 8 with a sulfur containing radical,
      to the poly acrylate (co) polymer binder, is in the range of from 3:1 to 30:1.

7. The composition according to claim 1, wherein the composition is substantially free of polyvinyl acetate and substantially free of partially hydrolysed polyvinyl acetate.

8. The composition according to claim 1, wherein the composition comprises polyvinyl acetate or partially hydrolysed polyvinyl acetate and the amount of the polyvinyl acetate or the partially hydrolysed polyvinyl acetate in the composition is less than 2 wt %.

9. The composition according to claim 8, wherein the amount of the polyvinyl acetate or the partially hydrolysed polyvinyl acetate in the composition is less than 1 wt %.

* * * * *